Sept. 13, 1932.  W. S. WASHBURN  1,877,098
PLANT STAND
Filed Oct. 20, 1930    2 Sheets-Sheet 1
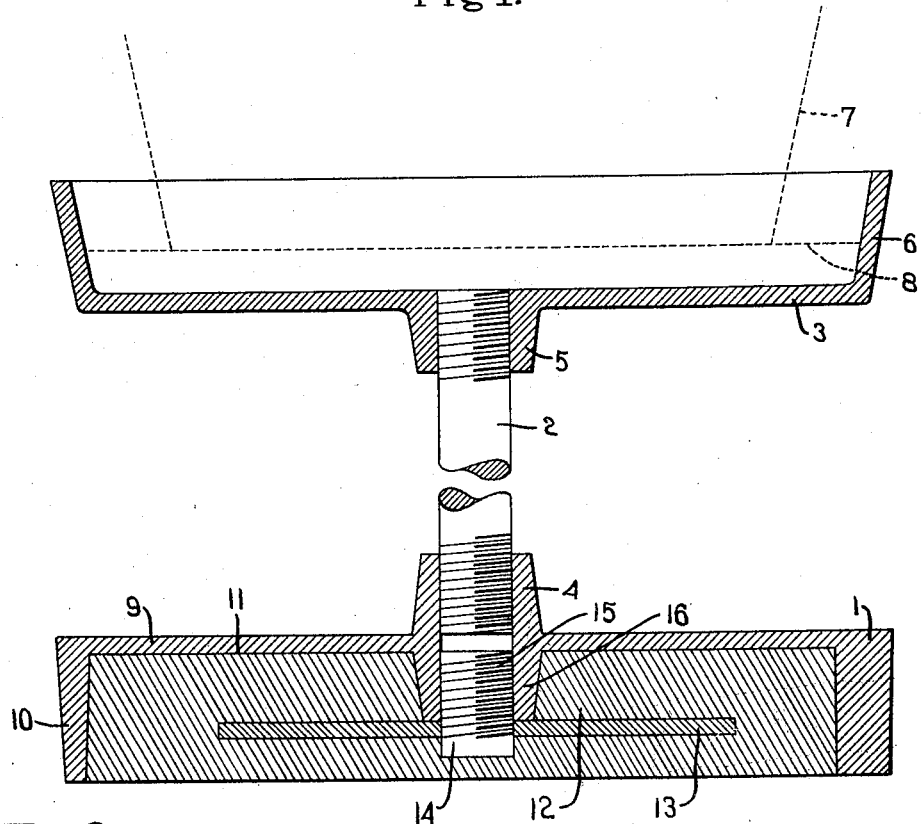
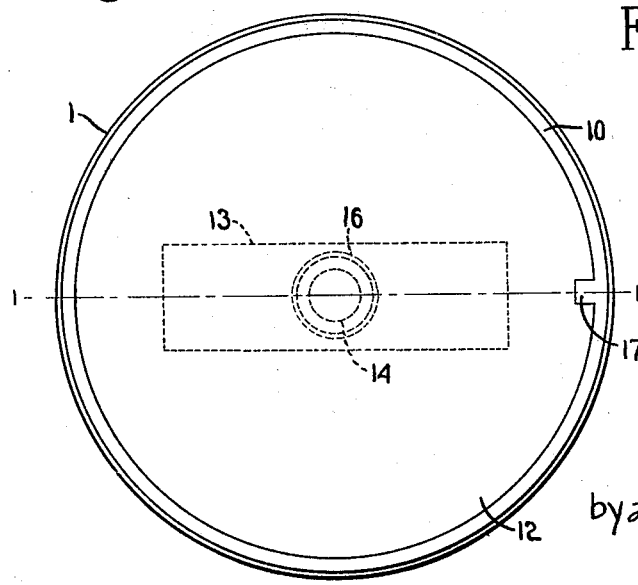
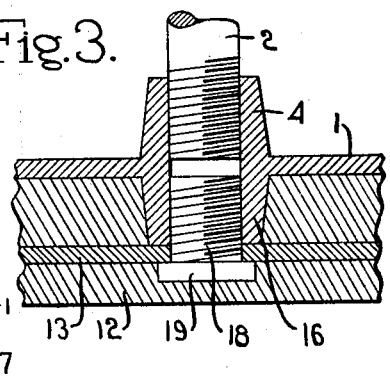
Inventor:
William S. Washburn
by Heard Smith & Tennant.
Attys.

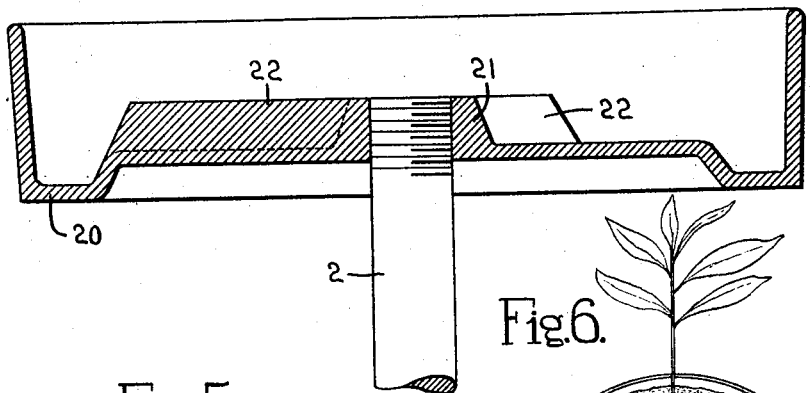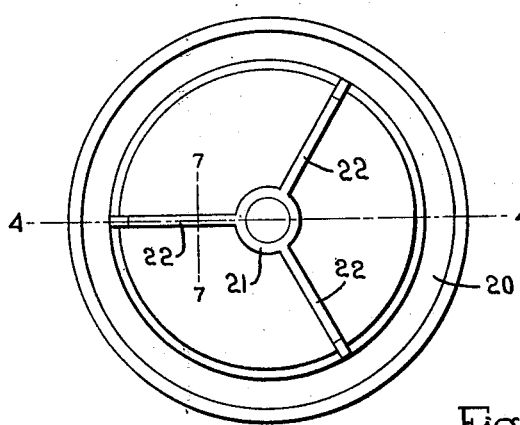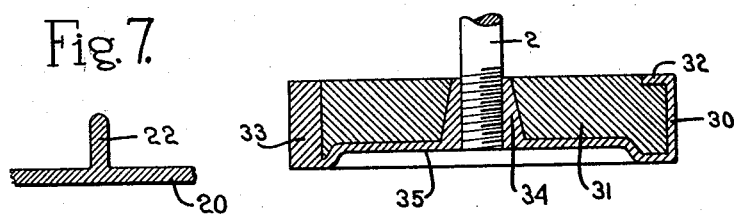

Patented Sept. 13, 1932

1,877,098

UNITED STATES PATENT OFFICE

WILLIAM S. WASHBURN, OF BROCKTON, MASSACHUSETTS

PLANT STAND

Application filed October 20, 1930. Serial No. 489,828.

This invention relates to plant stands which are designed for use in greenhouses, conservatories, florists' shops and like places for the purpose of supporting a plant in raised position as compared with other plants not placed on a plant stand.

An object of the invention is to provide a plant stand for this purpose which can be inexpensively manufactured.

Another object of the invention is to provide a novel plant stand comprising a supporting base, a standard rising therefrom and a plant-supporting member carried by the standard and in which the standard is interchangeable so that by using standards of different lengths plant stands of different heights can be provided.

Further objects of the invention are to provide a novel plant stand having various advantageous features which will be hereinafter set forth.

In order to give an understanding of the invention I have illustrated in the drawings a selected embodiment thereof which will now be described after which the novel features will be pointed out in the appended claims.

Fig. 1 is a vertical sectional view of a plant stand embodying my invention with a part of the stem broken out;

Fig. 2 is a reduced under side view;

Fig. 3 is a fragmentary view showing a modification of the invention;

Fig. 4 is an enlarged sectional view taken on the line 4—4, Fig. 5 showing a different embodiment of the invention;

Fig. 5 is a plan view of Fig. 4 on a reduced scale;

Fig. 6 is a perspective view of a plant stand embodying my invention;

Fig. 7 is a section on the line 7—7, Fig. 5;

Fig. 8 is a fragmentary sectional view showing a different embodiment of the invention.

My improved plant stand comprises a supporting base, a stem detachably secured thereto and rising therefrom and a plant-supporting member detachably secured to the upper end of the stem. In the construction shown in Fig. 1, which is my preferred construction, the supporting base is indicated at 1, the stem at 2 and the plant-supporting member at 3. The stem 2 is shown in the form of a rod screw threaded at both ends, the lower end of the rod screwing into a central boss 4 rising from the supporting base 1 and the upper end of the rod screwing into a boss 5 formed on the under side of the plant-supporting member 3.

The plant-supporting member 3 may have any suitable shape. It may be in the form of a flat plate or may have a general saucer shape as shown in the drawings wherein it is provided with the upstanding peripheral curb or wall 6. In either case it is constructed to receive a flower pot as indicated by the dotted lines 7. If the plant-supporting member 3 has a saucer shape as illustrated it may be partially filled with some absorbent material 8 like sand or cinders or peat moss on which the flower pot may rest. The advantage of using this bed 8 of absorbent material is that if surplus water is used in watering the plant, such water will drain into and be absorbed by the bed 8 and may subsequently be reabsorbed back into the earth in the flower pot and thus keep the plant moist.

The supporting base 1 is preferably made relatively heavy so that it will provide a firm support for the plant stand. In the construction shown in Fig. 1 the supporting base comprises a base member 9 preferably of metal which is provided with a depending peripheral flange 10 thus forming within the member a cavity 11 open at the bottom. This cavity may be filled with a plastic or molten material thereby producing a supporting base of sufficient weight to hold the stand firmly in upright position. Any suitable plastic or molten material may be used for this purpose but I will preferably use cement or concrete as indicated at 12. The cement 12 forms the major portion of the volume of the supporting base and since the cement is less expensive than cast iron this method of construction provides a sufficiently solid base at a reduced cost.

In order to firmly anchor the cement in the base member 9 I propose to construct the supporting base with an anchoring member which is embedded in the concrete 12 and which is attached to the base member 9. The anchoring member will be installed in the cavity 11 before the cement 12 is poured so that as the cement is poured said member will become embedded in the cement. When the cement hardens the anchoring member thus ties the cement to the base member 9.

This anchoring member may have various constructions without departing from the invention. In Figs. 1 and 2 it is shown as a metal plate 13 which is secured to a stud 14 that in turn is attached to or supported from the base member 9 in such a way that the anchoring member 13 is located within the cavity 11.

As shown in Fig. 1 the stud 14 is provided with screw threads 15 which extend from the upper end nearly to the lower end and said stud is screw threaded through the plate 13 as far as the screw threads 15 will permit. The upper screw-threaded end of the stud is then screw threaded into a boss 16 depending into the cavity 11.

After the anchoring plate has been thus installed or attached to the base member 9 then the cement 12 may be poured into the cavity 11. The cement will, of course, flow all around the anchoring member 13 and when the cement sets said anchoring member will be completely embedded in the cement mass thus firmly anchoring the latter to the base member 9. It will be noted that the anchoring member 13 is embedded in the central portion of the concrete mass 12, and therefore, it acts not only to anchor the concrete in the cavity but also to reinforce the concrete.

In the preferred embodiment of my invention the two bosses 4 and 16 will be in alignment and the openings therethrough into which the stem 2 and stud 14 are screwed will also be in alignment. With this construction the opening through the two bosses 4 and 16 may be tapped at one operation and when the stand is completed the stud 14 will be screwed into the lower end of the opening while the stem 2 will be screwed into the upper end of the opening.

As a further means of interlocking the cement body 12 to the base member 9 the latter is provided with a vertical rib 17 on the inner face of the skirt or flange 10. When the cement 12 has hardened, said rib 17 will occupy a groove in the periphery of the cement body and thus prevent said body from having any turning motion relative to the base member 1.

In Fig. 3 a slightly different construction is illustrated wherein the stud by which the anchoring member is secured in position is provided with a head. This stud is shown at 18 and it has a screw-threaded shank adapted to screw into the boss 16 and also is formed with a head 19 which engages the under side of the anchoring member 16.

In Figs. 4 and 5 I have shown a different form of plant-supporting member. This member, which is indicated at 20, is dish-shaped and is provided with a central boss 21 which is screw threaded onto the upper end of the stem 2.

On the interior of the plant-supporting member 20 and rising from the bottom are one or more ribs 22 on which the flower pot or plant container may rest. These ribs may have any desirable shape and are herein shown as radial. Their object is to provide a stable base or rest for the flower pot or plant container when the moisture-absorbing material is omitted. With this construction the flower pot or plant container is supported slightly above the bottom of the plant-containing member whereby a reservoir is provided beneath the flower pot to receive seepage resulting from excessive watering of the plant. This type is especially useful where it is desirable to provide proper drainage for the flower pot.

In Fig. 8 I have shown still a different embodiment of the invention wherein the base comprises a hollow or dish-shaped base member 30 of metal which is open at the top and which is filled with cement or concrete 31. This base is provided with the peripheral rib 32 at its upper edge which overlies the peripheral portion of the concrete and thus holds the latter in place and it is also made with the vertical rib 33 similar to the rib 17 which prevents the concrete from turning in the base member.

The base member is also formed with the boss 34 into which the stem 2 may be screwed. This form of base member may also be used as a plant-supporting member by simply screwing it to the top of the stem 2 in a reverse position from that shown in Fig. 8 so that what is the lower side of the member 30 in Fig. 8 will be the upper side when used as a plant-supporting member. When used as a plant-supporting member the concrete or cement filling 31 will not be used.

It will be noted that the member 30 has the dished face 35 into which a flower pot may be set when the member is used as the plant-supporting member at the upper end of the stem.

I claim:

1. In a plant stand, the combination with a supporting base comprising a base member having a peripheral depending flange and a depending central boss, concrete filling the cavity in said base formed by said flange, an anchoring member embedded in said concrete and a stud secured to the anchoring member and screw threaded into said boss, of a stem detachably secured to the supporting base, and a flower-pot-supporting member detachably secured to the upper end of the stem.

2. In a plant stand, the combination with a supporting base comprising a base member having a peripheral depending flange, concrete filling the cavity in said base member formed by said flange, an anchoring member separate from the base member embedded in the concrete mass, and means to connect the anchoring member to the base member, of a stem detachably secured to the supporting base and a flower-pot-supporting member detachably secured to the upper end of the stem.

3. In a plant stand, the combination with a supporting base comprising a base member having a peripheral depending flange, concrete filling the cavity in said base member formed by said flange, an anchoring member separate from the base member embedded in the concrete mass, and a stud for securing said anchoring member to the base member, of a stem detachably secured to the supporting base and a flower-pot-supporting member detachably secured to the upper end of the stem.

In testimony whereof, I have signed my name to this specification.

WILLIAM S. WASHBURN.